(12) United States Patent
Salvatore et al.

(10) Patent No.: US 12,240,136 B2
(45) Date of Patent: Mar. 4, 2025

(54) RAZOR BLADE AND COMPOSITION FOR A RAZOR BLADE

(71) Applicant: Edgewell Personal Care Brands, LLC, Chesterfield, MO (US)

(72) Inventors: William Salvatore, Watertown, CT (US); Yiming Xu, Milford, CT (US)

(73) Assignee: Edgewell Personal Care Brands, LLC, Chesterfield, MO (US)

( * ) Notice: Subject to any disclaimer, the term of this patent is extended or adjusted under 35 U.S.C. 154(b) by 486 days.

(21) Appl. No.: 17/432,235

(22) PCT Filed: Jan. 8, 2020

(86) PCT No.: PCT/US2020/012701
§ 371 (c)(1),
(2) Date: Aug. 19, 2021

(87) PCT Pub. No.: WO2020/176163
PCT Pub. Date: Sep. 3, 2020

(65) Prior Publication Data
US 2022/0250266 A1  Aug. 11, 2022

Related U.S. Application Data

(60) Provisional application No. 62/811,694, filed on Feb. 28, 2019.

(51) Int. Cl.
*B26B 21/58* (2006.01)
*B21D 53/60* (2006.01)
(Continued)

(52) U.S. Cl.
CPC .............. *B26B 21/58* (2013.01); *B21D 53/60* (2013.01); *B26B 21/4068* (2013.01);
(Continued)

(58) Field of Classification Search
CPC ... B26B 21/58; B26B 21/4068; B26B 21/565; B26B 21/56; B21D 53/645; C21D 1/18;
(Continued)

(56) References Cited

U.S. PATENT DOCUMENTS

| 4,378,634 A | 4/1983 | Jacobson |
| 4,586,255 A | 5/1986 | Jacobson |

(Continued)

FOREIGN PATENT DOCUMENTS

| CN | 1143922 A | 2/1997 |
| CN | 1812856 A | 8/2006 |

(Continued)

OTHER PUBLICATIONS

International Search Report and Written Opinion issued in connection with PCT Application No. PCT/US2020/012701 dated Mar. 20, 2020.

(Continued)

*Primary Examiner* — Phong H Nguyen

(57) ABSTRACT

A razor blade has a first and a second portion. The first portion has a cutting edge at an exterior end and is angled relative to the second portion by a bending process. A bent region that can be arcuate is intermediate the first and second portions. The razor blade is manufactured from martensitic stainless steel being mostly iron and having (by weight): 0.40 to 0.60% C; 0.30 to 0.55% Si; 0.70 to 0.90% Mn; 13.0 to 14.0% Cr; 0.50 to 1.0% Mo; and 0.03 to 0.2%, more preferably 0.03-0.1% N.

19 Claims, 2 Drawing Sheets

(51) Int. Cl.
- *B26B 21/40* (2006.01)
- *B26B 21/56* (2006.01)
- *C21D 1/18* (2006.01)
- *C21D 6/00* (2006.01)
- *C21D 9/18* (2006.01)
- *C22C 38/00* (2006.01)
- *C22C 38/02* (2006.01)
- *C22C 38/04* (2006.01)
- *C22C 38/22* (2006.01)

(52) U.S. Cl.
CPC .............. *B26B 21/565* (2013.01); *C21D 1/18* (2013.01); *C21D 6/002* (2013.01); *C21D 6/005* (2013.01); *C21D 6/008* (2013.01); *C21D 9/18* (2013.01); *C22C 38/001* (2013.01); *C22C 38/002* (2013.01); *C22C 38/02* (2013.01); *C22C 38/04* (2013.01); *C22C 38/22* (2013.01)

(58) Field of Classification Search
CPC ........ C21D 6/002; C21D 6/005; C21D 6/008; C21D 9/18; C22C 38/001; C22C 38/002; C22C 38/02; C22C 38/04; C22C 38/22
USPC .......................................... 30/346.54, 346.53
See application file for complete search history.

(56) References Cited

U.S. PATENT DOCUMENTS

| | | | |
|---|---|---|---|
| 5,017,246 A * | 5/1991 | Miyasaka | C22C 38/38 148/326 |
| 5,275,672 A | 1/1994 | Althaus et al. | |
| 5,433,801 A | 7/1995 | Althaus et al. | |
| 2007/0124944 A1 | 6/2007 | Thoene et al. | |
| 2007/0186424 A1 | 8/2007 | Becker et al. | |
| 2007/0234576 A1 | 10/2007 | Masek et al. | |
| 2007/0234577 A1 | 10/2007 | Masek et al. | |
| 2010/0107425 A1 | 5/2010 | Bykowski et al. | |
| 2011/0239466 A1 | 10/2011 | Van Eibergen Santhagens | |
| 2013/0309126 A1 | 11/2013 | Jo et al. | |
| 2014/0230252 A1 | 8/2014 | Davos et al. | |
| 2016/0361828 A1 | 12/2016 | Xu et al. | |
| 2019/0193292 A1 | 6/2019 | Davos et al. | |

FOREIGN PATENT DOCUMENTS

| | | |
|---|---|---|
| CN | 101886226 A | 11/2010 |
| CN | 102665964 A | 9/2012 |
| CN | 107810285 A | 3/2018 |
| CN | 108349101 A | 7/2018 |
| EP | 2763823 B | 5/2018 |
| EP | 3375578 A | 9/2018 |
| WO | 2014014246 A1 | 1/2014 |

OTHER PUBLICATIONS

Unofficial translation of Chinese Office Action and Search Report issued in connection with CN Patent Application No. 202080017452.4 dated Dec. 1, 2022.

Unofficial translation of office action issued in connection with Chinese Patent Application No. 202080017452.4 dated Apr. 28, 2023.

* cited by examiner

RAZOR BLADE AND COMPOSITION FOR A RAZOR BLADE

BACKGROUND

1. Technical Field

The present disclosure relates to razor blades in general and, most particularly, to a composition for a razor blade having a bent portion and a method of making the razor blade.

2. Background

Many modern safety razors include a disposable razor cartridge adapted to be selectively connected to a reusable handle by connecting structure therebetween. The cartridge includes a frame having at least one razor blade with a sharpened cutting edge disposed therein. Other modern safety razors include a razor cartridge permanently connected to the handle that can be disposed of as a single unit.

The performance and commercial success of a razor cartridge is a balance of many factors and characteristics that include durability of its cutting edge, and rinsability i.e. the ability of the user to be able to easily rinse cut hair, skin particles and other shaving debris from the razor cartridge and especially from between adjacent razor blades or razor blade structures. Examples of some razor blade structures can be seen in U.S. Pat. Nos. 4,378,634 and 4,586,255, both to Jacobson, which show a planar razor blade attached (e.g. welded) to a bent metal support.

U.S. patent application publication number 2007/0234576 acknowledges the benefits of the above, e.g. '634 patent's structure and proposes replacing the planar blade on a bent support by a razor blade including a bent portion. A razor cartridge including a (bent) razor blade having a bent portion is disclosed to have manufacturing advantages. The '576 application, and also U.S. patent application publications 2010/0107425 and 2014/0230252 disclose compositions for their respective razor blades and methods of forming their respective bent portions.

Challenges to the manufacture of a commercially acceptable razor cartridge with a bent blade include overcoming manufacturing issues such as cracking occurring in a hardened (e.g. stainless steel) body in the vicinity of the bend, and more especially on the outer surface of the bend. While cracks of a micro scale located in the outer surface of the bend can be acceptable, cracks of a macro scale can have the following disadvantages: a crack itself is a fracture in the blade body but also provides an initiation site that facilitates further fracture or even breakage of the razor blade during normal use when mounted in its cartridge housing. Cracks also can provide initiation sites for accelerated corrosion that can also result in failure of the razor blade. Failure or fracture of a razor blade can result in nicks and cuts for the user.

Cracking can be substantially avoided by providing enhanced ductility of the blade material at the region of the bent portion. U.S. patent application publications 2007/0124939 and 2007/0234577 disclose methods of locally heat treating a portion of a hardened razor blade body to enhance ductility however, these process(es) require an additional manufacturing step that can be undesirable. Enhanced ductility can also be provided by not fully hardening the blade or by using a more ductile grade of stainless steel. In these two examples the enhanced ductility is found throughout the entire razor blade including its cutting edge. A cutting edge with enhanced ductility can be undesirably less durable, i.e. less able to withstand multiple shaving operations.

Cracking can further be substantially avoided by bending the razor blade through a smaller range and/or by bending the razor blade at a greater bend radius. These physical shape considerations can be undesirable in the overall design of the razor cartridge.

SUMMARY

The present disclosure has for its objective to eliminate, or at least substantially alleviate the limitations of the prior art razor blades. The present disclosure is directed particularly to a razor blade and a method of making the razor blade. The razor blade has a first portion and a second portion, the first portion having a cutting edge at an exterior end thereof and that can extend along a length of the razor blade, and being angled relative to the second portion by a bending process. The razor blade has a bent region intermediate the first portion and the second portion. The razor blade comprises a martensitic stainless steel provided as a strip and comprising mainly iron and having {by weight}: 0.40 to 0.60% Carbon; 0.30 to 0.55% Silicon; 0.70 to 0.90% Manganese; 13.0 to 14.0% Chromium; 0.50 to 1.0% Molybdenum, and Nitrogen in a range 0.03 to 0.2%, more preferably 0.03 to 0.1%, and most preferably 0.08%. The martensitic stainless steel can further comprise (by weight) Sulphur in a range up to 0.02% and Phosphorous in a range up to 0.0025%.

In other aspects of the above aspect, the first portion is angled relative to the second portion by an angle in a range 105 to 130 degrees. The bent region can be arcuate and can have an external radius in a range 0.2 to 1.5 mm, preferably 0.3 to 0.8 mm, more preferably 0.3 to 0.5 mm. The second portion has a thickness in a range 0.05 to 0.125 mm, preferably 0.076 mm.

In further aspects of any of the preceding aspects, the bending process is not preceded by a reheating process to modify the structure at the bending region.

In further aspects of any of the preceding aspects the razor blade, in a region of the cutting edge, has a hardness in a range 550 to 640 HV.

Without being limited by theory, it is believed the nitrogen alloyed martensitic structure is finer and more uniform than carbon alloyed material, giving a very fine precipitate distribution and superior properties on tempering. The razor blade can be bent to a desired shape without cracking while possessing a durable cutting edge. The above features and advantages will be more fully understood with reference to the following detailed description when taken in conjunction with the accompanying drawings.

BRIEF DESCRIPTION OF THE DRAWINGS

FIG. 1 is a schematic representation of the process steps of the present disclosure, and.

DETAILED DESCRIPTION

Martensitic stainless steels having a carbon content 0.6-0.7% or more, about 13% (e.g. 12.5% to 13.5%) chromium and substantially free of molybdenum have been used for making razor blades. These materials are widely available, have adequate corrosion resistance for their intended use and can be sharpened to provide a high-quality cutting edge.

Exemplary commercially available materials are those such as GINS made by HITACHI METALS and 13C26 made by SANDVIK. These materials appear as Alloy 1 in Table 1, below. Another commercially available martensitic stainless steel suitable for manufacturing razor blades is the grade designated GIN7 manufactured by HITACHI METALS that appears as Alloy 2 in Table 1. Alloy 3 and Alloy 4 are experimental compositions according to the present disclosure.

TABLE 1

| (All % by weight) | C % | Cr % | Si % | Mn % | Mo % | N % | Fe |
|---|---|---|---|---|---|---|---|
| Alloy 1 | 0.62-0.75 | 12.7-13.7 | 0.2-0.5 | 0.45-0.75 | ≤trace | 0 | Balance |
| Alloy 2 | 0.48-0.52 | 13.0-14.0 | 0.3-0.55 | 0.7-0.9 | 1.2-1.4 | 0 | Balance |
| Alloy 3 | 0.45-0.6 | 13.0-14.0 | 0.3-0.55 | 0.7-0.9 | 0.5-1.0 | 0 | Balance |
| Alloy 4 | 0.45-0.6 | 13.0-14.0 | 0.3-0.55 | 0.7-0.9 | 0.5-1.0 | 0.03-0.1 | Balance |

(All alloys can contain ≤0.02 Sulphur and ≤0.0025 Phosphorous, Alloy 4 can contain 0.03-0.2% N).

Figure 1:
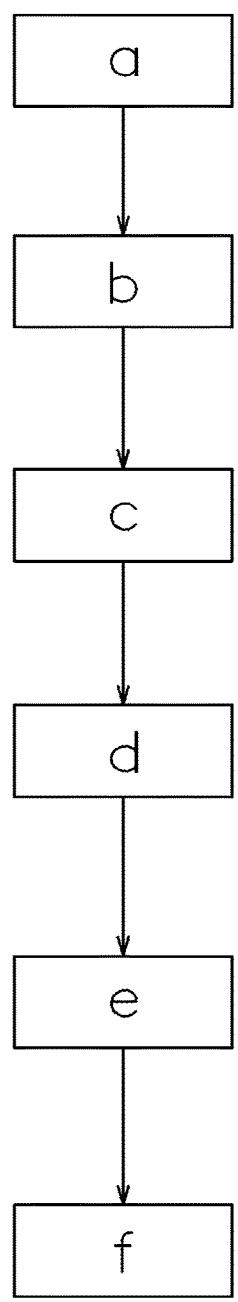
Figure 1:
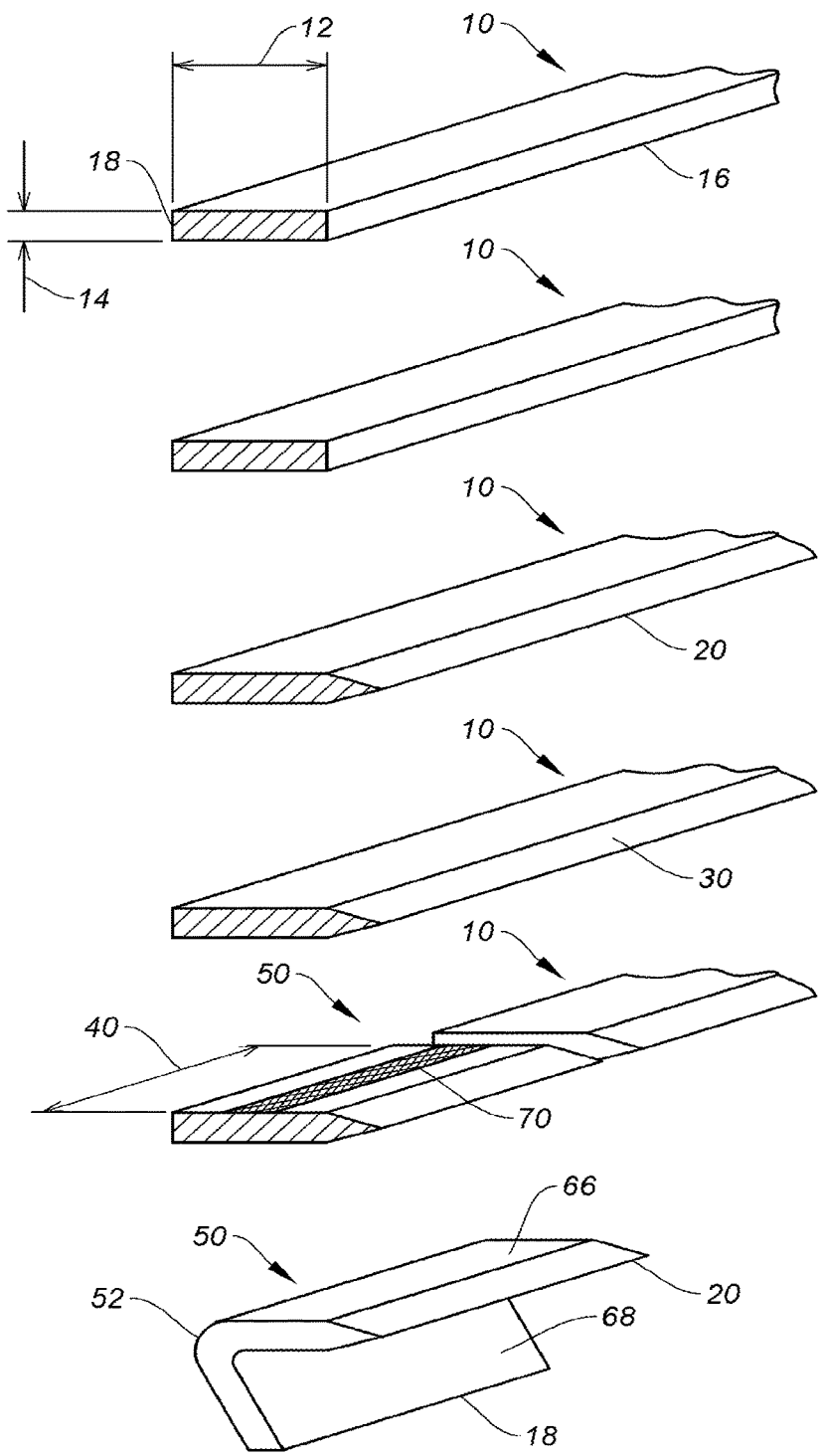

Referring now to the drawings and in particular FIG. 1, exemplary process steps for the manufacture of a so-called single edge razor blade having a bent portion of the alloys under evaluation are schematically depicted. Elongated stainless steel strip 10, as provided, is depicted at step (a). The strip has a width 12 and a thickness 14 and includes a front edge portion 16 and a back edge portion 18. The width of the strip is preferably about 3 mm wide but can be any width to suit the application at hand from about 2 mm or less to about 22 mm or more. The thickness 14 of the strip as-provided can be 0.1 mm or less but is preferably about 0.076 mm. In other cases strip having a thickness 14 of about 0.025-0.05 mm or greater than 0.1 mm, e.g. 0.125 mm can be employed. At step (b) the strip 10 is hardened and tempered to a hardness about 660-850 HV by well-known process(es). At step (c) the front edge is sharpened by any well-known sharpening process such as grinding and honing to provide an elongated cutting edge 20. As an alternative to the aforementioned, a double-edge razor blade can be employed. Strip material having a suitable width (e.g. about 22 mm) is perforated in continuous strip form to provide apertures that can include an elongated center slot that can be used to support or locate the blade strip during subsequent processes such as edge forming and edge coating and location holes that can be used to index the strip or to locate a discrete razor blade during certain processes. Process steps (b) and (c) are performed as described above, with an exception that both the front edge and back edge portions 16, 18 are sharpened to provide cutting edges. The elongated strip is then separated into discrete double edge razor blades. Process step (d) (below) is performed to both cutting edges as described above. The double edge razor blade is then split preferably adjacent the ends of the center slot to provide two single edge razor blades. Thereafter process step (f) (below) is performed. Returning to the single edge razor blade, at step (d) suitable coating(s) 30 applied to the cutting edge by well-known processes. One or more under-coatings can include, but are not limited to, one or more of chromium, platinum, niobium, titanium, alloys of the aforementioned materials and compounds of the aforementioned materials compounded with e.g. carbon or nitrogen. A suitable titanium coating is disclosed in commonly assigned U.S. patent application publication 2007/0186424 the disclosure of which is hereby incorporated for reference in its entirety. Also various types of hard carbon coatings such as amorphous diamond, diamond-like-carbon (DLC) and combinations with the above can be applied. An outer coating of a fluoropolymer material, preferably PTFE is applied. A suitable PTFE coating is disclosed in commonly assigned U.S. patent application publication 2007/0124944 the disclosure of which is hereby incorporated for reference in its entirety, but the present application is not limited in this regard and any suitable PTFE coating can be employed. The PTFE coating can be cured and the curing process has a secondary effect of annealing at least the portion of the strip containing the cutting edge to a hardness at least 550 HV and preferably about 620-640 HV. At step (e) a lengthwise extending portion 40 is cut from the strip to provide a discrete razor blade 50. The discrete razor blade has properties of the strip from which it was cut. At step (l) the razor blade 50 is bent to provide a bent portion 52 intermediate a first portion 66 containing the cutting edge 20 and a second portion 68 containing the back edge portion 18.

Figure 2:
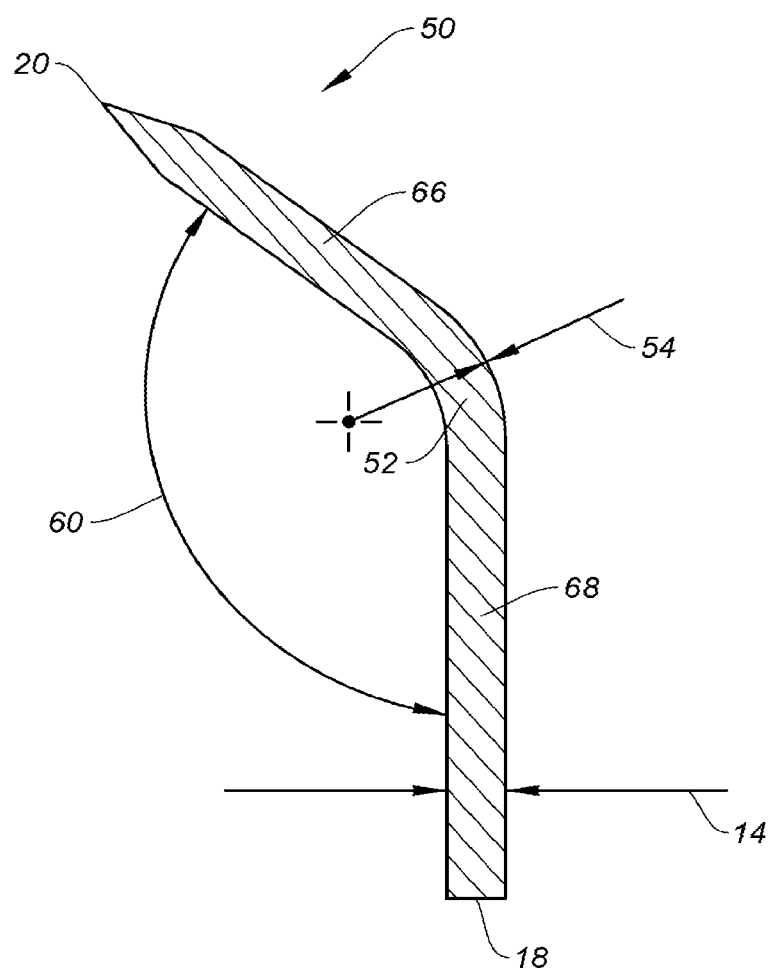
FIG. 2 is a schematic sectional view of a razor blade of the present disclosure.

A representative sectional view of the razor blade 50 having a bent portion 52 is shown in FIG. 2. The bending process can be a punch-and-die process. The bending process can also be a "swivel bending" process, e.g. as described in commonly assigned U.S. patent application publication 2010/0107425 the disclosure of which is hereby incorporated for reference for its disclosure of a bending process. The bending process can also be any suitable process to impart a bent portion to a razor blade. The bending process is preferably performed without any prior reheating process to modify the razor blade's structure or ductility in the region of the razor blade being bent, i.e. the region 70 (see FIG. 1) that subsequently becomes the bent portion 52 after the bending process.

Razor blades having bent portions of the four alloys (Alloy 1-Alloy 4) were produced according to varying thickness (t, 14), hardness (Hv), bend angle (α, 60) and outer bend radius (Ro, 54) as shown in Table 2, below and depicted in FIG. 2. The razor blades were examined for the presence of end cracks and evaluated for the relative durability of the cutting edge. Cutting edge durability can be evaluated by well-known methods of physically cutting the cutting edge into certain media multiple times and microscopically inspecting the razor blade for damage or permanent distortion of its extreme cutting edge.

TABLE 2

| Test # | Alloy | t | Hv | α | Ro | Crack | ED |
|---|---|---|---|---|---|---|---|
| 1 | Alloy 1 | 0.1 | 620 | 123 | 1.3 | ≤100 | 1 |
| 2 | Alloy 1 | 0.076 | 550 | 108-112 | 0.92 | ≤10 | 4 |
| 3 | Alloy 1 | 0.076 | 620 | 123 | 0.98 | ≤100 | 1 |
| 4 | Alloy 1 | 0.076 | 610 | 118 | 0.98 | ≤100 | 1 |
| 5 | Alloy 2 | 0.076 | 590 | 108-112 | 0.48 | None | 3 |

TABLE 2-continued

| Test # | Alloy | t | Hv | α | Ro | Crack | ED |
|---|---|---|---|---|---|---|---|
| 6 | Alloy 3 | 0.076 | 610 | 110 | 0.7 | None | 2 |
| 7 | Alloy 4 | 0.076 | 610 | 110 | 0.3-0.48 | None | 2 |

Where: t = strip thickness (mm);
Hv = strip hardness (Vickers) at 200 g load on cross section, all hardness values ± 20 units;
α = bend angle (degrees);
Ro = outer radius of bent region (mm);
Crack = presence of end cracks at dimension noted (microns);
ED = cutting edge durability, ranked 1-4 where 1 = most durable, 4 = least durable, as evaluated.

The addition of Nitrogen to Alloy 4 advantageously provides a razor blade of desirable ductility wherein the bent portion can beneficially have a smaller outer bend radius with a low bend angle while the razor blade exhibits a relatively desirable cutting edge durability. Without being limited by theory, it is believed the nitrogen alloyed martensitic structure is finer and more uniform than carbon alloyed material, giving a very fine precipitate distribution and superior properties on tempering.

While various embodiments have been described above, it should be understood that they have been presented by way of example only, and not limitation. For instance, modifications or changes as can be made within the scope of the attached claims and features disclosed in connection with any one embodiment can be used alone or in combination with each feature of the respective other embodiments. Thus, the breadth and scope of any embodiment should not be limited by any of the above described exemplary embodiments but should be defined only in accordance with the following claims and their equivalents.

What is claimed is:

1. A razor blade, comprising:
   a first portion and a second portion, the first portion having a cutting edge at an exterior end thereof and being angled relative to the second portion by a bending process; and
   a bent region intermediate the first portion and the second portion;
   wherein the razor blade is a martensitic stainless steel consisting essentially of mainly iron and having by weight:
   0.40 to 0.60% Carbon
   0.30 to 0.55% Silicon
   0.70 to 0.90% Manganese
   15.0 to 14% Chromium
   0.50 to 1.0% Molybdenum
   0.03 to 0.2% Nitrogen
   Sulphur in a range up to 0.02%
   Phosphorus in a range up to 0.0025%, and
   balance Iron.

2. The razor blade of claim 1, wherein the first portion is angled relative to the second portion by an angle in a range 105 to 130 degrees.

3. The razor blade of claim 1, wherein the bent region includes an external radius in a range 0.2 to 1.5 mm.

4. The razor blade of claim 1, wherein the second portion has a thickness in a range 0.05 to 0.125 mm.

5. The razor blade of claim 1, wherein the bending process is not preceded by a reheating process to modify the razor blade at a bending region.

6. The razor blade of claim 1, wherein the razor blade, in a region of the cutting edge, has a hardness in a range 550 to 640 HV.

7. The razor blade of claim 1, wherein the cutting edge extends along a length of the razor blade.

8. The razor blade of claim 1, wherein the martensitic stainless steel contains by weight 0.03 to 0.1% Nitrogen.

9. The razor blade of claim 1, wherein the structure has by weight: 0.1 to 0.2% Nitrogen.

10. The razor blade of claim 1, wherein the razor blade has a coating on the razor blade.

11. A method of making a razor blade, comprising the steps of:
   a) providing a martensitic stainless steel strip having a width and a thickness and including a front edge portion and a back edge portion, the strip consisting essentially of mainly iron having by weight:
      0.40 to 0.60% Carbon
      0.30 to 0.55% Silicon
      0.70 to 0.90% Manganese
      15.0 to 14% Chromium
      0.50 to 1.0% Molybdenum
      0.03 to 0.2% Nitrogen
      Sulphur in a range up to 0.02%
      Phosphorus in a range up to 0.0025%, and
      balance Iron;
   b) hardening the strip;
   c) forming a cutting edge along at least one of the front edge portion and rear edge portion;
   d) applying a coating comprising at least a fluoropolymer material to the cutting edge and curing the fluoropolymer material to thereby anneal at least a portion containing the cutting edge to a hardness at least 550 HV; preferably 620-640 HV;
   e) separating the strip to provide a discrete length; and
   f) forming the discrete length in a bending process to provide a bent region intermediate a first portion having the cutting edge at an exterior end thereof, the first portion being angled relative to a second portion.

12. The method of claim 11, wherein step d) is performed after step e).

13. The method of claim 11, wherein the bent region includes an external radius in a range 0.2 to 1.5 mm.

14. The method of claim 11, wherein the strip has a thickness in a range 0.05 to 0.125 mm.

15. The method of claim 11, wherein the first portion is angled relative to the second portion by angle in a range 105 to 130 degrees.

16. The method of claim 11, wherein the step f) is a swivel bending process.

17. The razor blade of claim 11, wherein the martensitic stainless steel contains by weight 0.03 to 0.1% Nitrogen.

18. A method of making a razor blade, comprising the steps of:
   a) providing a martensitic stainless steel strip having a width and a thickness and including a front edge portion and a back edge portion, the strip consisting essentially of mainly iron having by weight:
      0.40 to 0.60% Carbon
      0.30 to 0.55% Silicon
      0.70 to 0.90% Manganese
      13.0 to 14% Chromium
      0.50 to 1.0% Molybdenum
      0.03 to 0.2% Nitrogen
      Sulphur in a range up to 0.02%
      Phosphorus in a range up to 0.0025%, and
      balance Iron;
   b) hardening the strip;
   c) forming a cutting edge along at least one of the front edge portion and rear edge portion;

d) applying a coating to the cutting edge and curing coating to thereby anneal at least a portion containing the cutting edge to a hardness of at least 550 HV;
e) separating the strip to provide a discrete length; and
f) forming the discrete length in a bending process to provide a bent region intermediate a first portion having the cutting edge at an exterior end thereof, the first portion being angled relative to a second portion.

19. The method of claim 18, wherein the coating comprises at least a flouropolymer material.

* * * * *